United States Patent [19]

Otsubo et al.

[11] Patent Number: 4,475,801
[45] Date of Patent: Oct. 9, 1984

[54] FLASHLIGHT PHOTOGRAPHY PREPARING DEVICE OF A CAMERA

[75] Inventors: Yoshiaki Otsubo; Hiroshi Wakabayashi; Tadashi Otani, all of Yokohama, Japan

[73] Assignee: Nippon Kogaku K.K., Tokyo, Japan

[21] Appl. No.: 516,727

[22] Filed: Jul. 25, 1983

[30] Foreign Application Priority Data

Jul. 29, 1982 [JP] Japan .................. 57-131107

[51] Int. Cl.³ .............................. G03B 15/03
[52] U.S. Cl. ................................... 354/419
[58] Field of Search .................. 354/419, 418

[56] References Cited

FOREIGN PATENT DOCUMENTS 57-24924 2/1982 Japan .

Primary Examiner—Michael L. Gellner
Attorney, Agent, or Firm—Fitzpatrick, Cella, Harper & Scinto

[57] ABSTRACT

In a camera provided with a flash unit, a device for limiting the preparatory operation for flashlight emission of said flash unit comprises metering means for detecting that the brightness of an object to be photographed is lower than predetermined brightness and producing a detection signal, means operable to start photographing, the operable means having a first operation stage for producing a first signal and a second operation stage for producing a second signal subsequently to the first operation stage, the photographing being started in response to the second signal, and means including timer means responsive to the first signal to count a predetermined time set shorter than the time required from after the first signal is produced until photographing is started in response to the second signal, said means causing the flash unit to effect the preparatory operation for flashlight emission in response to the detection signal of the metering means produced while the timer means is effecting the time count.

6 Claims, 4 Drawing Figures

FLASHLIGHT PHOTOGRAPHY PREPARING DEVICE OF A CAMERA

BACKGROUND OF THE INVENTION

1. Field of the Invention

This invention relates to a camera containing a flash unit therein, and more particularly to a camera provided with a device for automatically setting the flash unit to a photography preparing condition when an object to be photographed is of low brightness.

2. Description of the Prior Art

Generally, in a camera of such type, the flash unit is designed to be supplied with power from a power source common to an exposure control device and/or an automatic focusing device. Also, the operation of causing the flash unit to project outwardly of the camera body by the electromagnetic force of an electromagnet supplied with power in response to the detection of the low brightness of the object to be photographed by a metering circuit (auto pop-up) is effected and the operation of the flash unit is started in response to the auto pop-up operation. However, in the device of this type, there has been no control of the auto pop-up operation and therefore, the flash unit has sometimes been automatically popped up during automatic focusing operation or during automatic exposure control operation. Thus, under the influence of the mechanical noise resulting from the auto pop-up and the electrical noise resulting from the flashlight emission preparing operation (for example, the boosting operation by a DC/DC converter) operatively associated with the auto pop-up, automatic focusing operation and automatic exposure control operation have become unstable.

In this regard, Japanese Laid-open patent application No. 24924/1982 discloses the technique of inhibiting the auto pop-up and subsequent flashlight emission preparing operation during automatic focusing operation or automatic exposure control operation. In this prior technique, it is preferable to give the exposure control operation or the automatic focusing operation a preference over the flashlight emission preparing operation in order to render the inhibition of the auto pop-up further reliable even when the object brightness has become low as soon as the operation of the exposure control device or the automatic focusing device is started.

SUMMARY OF THE INVENTION

It is an object of the present invention to provide a camera provided with a flash unit which reliably inhibits the automatic operation for flashlight emission preparation during exposure control or automatic focusing.

The camera of the present invention can reliably inhibit the automatic operation for flashlight emission preparation even if the brightness of an object to be photographed changes to low brightness simultaneously with the start of the operation for exposure control or automatic focusing.

The camera of the present invention makes said inhibiting operation possible without being provided with any special device for detecting that the operation for exposure control or automatic focusing is going on.

The camera of the present invention is provided with a timer circuit for limiting the period during which the automatic operation for flashlight emission preparation is possible to a predetermined period before the automatic focusing operation or the automatic exposure control operation is started. This timer circuit starts time count in the first stage of the photographing operation and permits the automatic operation for flashlight emission preparation only when a metering device detects the low brightness of the object to be photographed before a predetermined time elapses. In the second stage of the photographing operation, exposure control or automatic focusing is started. The time required for the shift from the first stage to the second stage is set to a value greater than the predetermined time by the timer circuit.

To obtain the first and second stages of the photographing operation, it is preferable to utilize the displacement of the first stroke and the second stroke of a shutter release operating lever. Thus, if the flashlight emission preparing operation is started during the framing of the object to be photographed after the displacement of the first stroke, the photographer can judge whether the automatic focusing operation or the automatic exposure control operation should be started (for example, by observing the operation of a display device for informing of the charged condition of the main capacitor of the flash unit), and can thus obviate failure in flashlight photography.

The invention will become more fully apparent from the following detailed description thereof taken in conjunction with the accompanying drawings.

DESCRIPTION OF THE PREFERRED EMBODIMENTS

Figure 1:
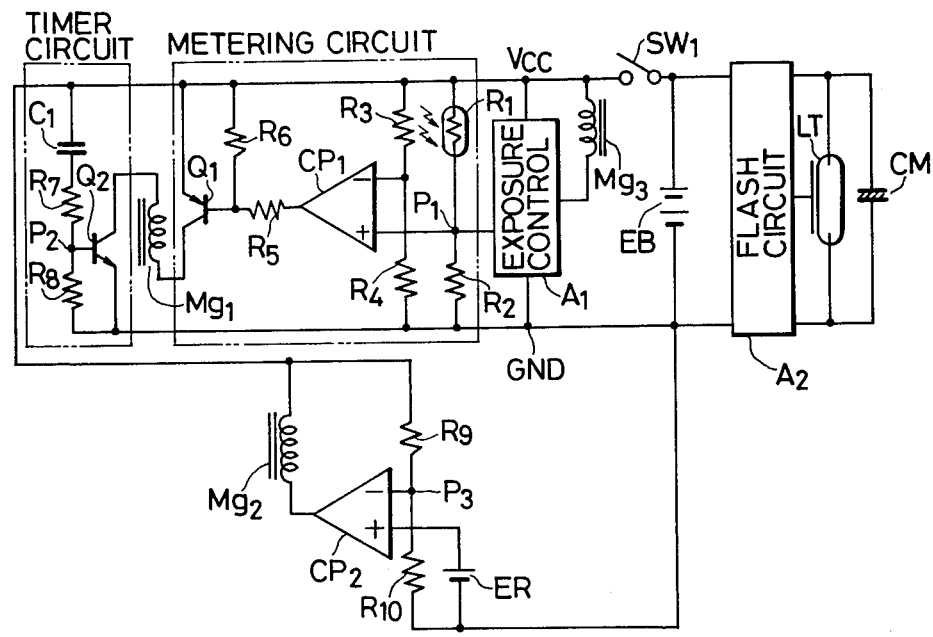
FIG. 1 diagramatically shows the circuit of a first embodiment of the present invention.

FIG. 1 shows a first embodiment of the present invention.

A switch SW1 is closed when a shutter release lever is depressed to the first stroke and at this time, power is supplied from a power source EB to a circuit shown at the left of the power source EB. A light-receiving element comprising a photoconductive element such as CdS or the like meters the object light. A comparator CP1 applies the metering output of the light-receiving element R1, namely, the voltage of a junction P1, as an input to a non-inverting input, and applies as an input to an inverting input a reference voltage obtained by dividing the voltage of the power source EB by resistors R3 and R4. Resistors R5 and R6 are connected to the output of the comparator CP1, and this output controls ON-OFF of a transistor Q1. Light-receiving element R1, comparator CP1, resistors R2, R3, R4, R5, R6 and transistor Q1 together constitute a metering circuit. An electromagnet Mg1, when electrically energized, causes a flash circuit A2 to pop up, that is, causes the light-emitting portion thereof to be projected above the camera so as to be convenient for flash photography. During this pop-up, the flash circuit A2 starts its flashlight emission preparing operation. That is, a DC/DC converter is started, and charging of a main capacitor CM is started and, when a light emission starting signal is then applied as an input, a flash discharge tube LT is caused to emit light by this charging voltage. The construction of a circuit for starting the DC/DC converter is disclosed, for example, in our U.S. patent application Ser. No. 257,356 filed on Apr. 24, 1981. A capacitor C1, resistors R7 and R8 and a transistor Q2 together constitute a timer circuit. In this timer circuit, the transistor Q2 is maintained conductive by the charging current to the capacitor C1 for a predetermined time after the switch SW1 has been closed. A comparator CP2 applies as an input to an inverting input the voltage of a junction P3 obtained by dividing the voltage of the power source EB by resistors R9 and R10 and applies a reference voltage ER as an input to a non-inverting input, and puts out L-level when the source voltage is sufficient. The L-level output of the comparator CP2 energizes an electromagnet Mg2. The electromagnet Mg2 controls the shutter release lock. These elements CP2, Mg2, ER, R9 and R10 together constitute a lock circuit. An exposure control circuit A1, when the shutter release lever is depressed to the second stroke, drives an electromagnet Mg3 in accordance with the metering output of the light-receiving element R1 to open or close the shutter, thereby controlling the exposure.

Figure 2:
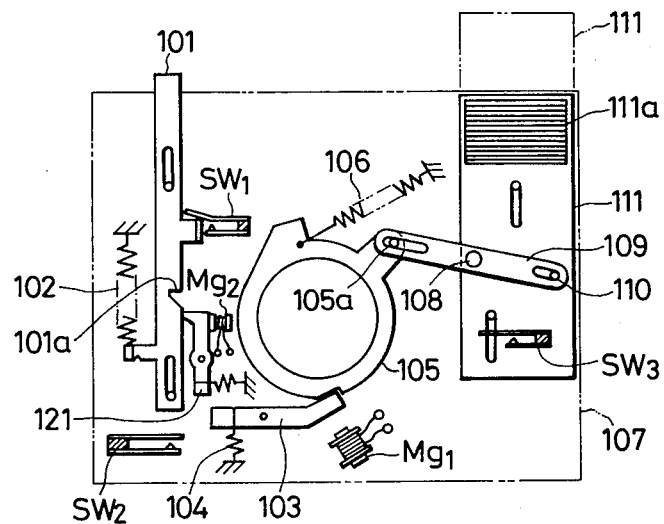
FIG. 2 shows an example of the mechanical construction of a camera to which the present invention is applied.

FIG. 2 schematically shows the structure of a camera containing a flash unit therein. When a shutter release lever 101 is depressed by the first stroke against the force of a spring 102, the main switch SW1 is closed. When the object brightness is low, the electromagnet Mg1 is electrically energized by the action of the metering circuit of FIG. 1 and attracts a restraining lever 103 against the force of a spring 104. Therefore, a change-over ring 105 released from restraint is rotated clockwisely by a spring 106. A lever 109 pivotable about a pin 108 fixed to a camera body 107 is pivoted counter-clockwisely by the pin 105a of the change-over ring to shift a flash unit 111 upwardly and cause a flash head 111a to pop up outwardly of the camera. After completion of the pop-up, the circumferential surface of the change-over ring becomes opposed to the restraining lever 103 and therefore, even if the power supply to the electromagnet is cut off in this condition, there will occur no inconvenience. The flash unit caused to pop up can be returned to its position of FIG. 2 by manually depressing it downwardly. The release lever 101 is provided with a locking groove 101a. A member 121 is biased counter-clockwisely by a spring and the position thereof is controlled by the electromagnet Mg2.

When the release lever 101 is depressed to the second stroke, a switch SW2 is operated and an exposure control circuit A1 and/or an automatic focusing device, not shown, starts its operation. A switch SW3 is closed during the pop-up of the flash unit and starts the DC/DC converter of a flash circuit A2.

Operation will now be described.

Description will first be made of a case where the source voltage is sufficient. The switch SW1 is closed by the shutter release lever being depressed to the first stroke. The voltage of a junction P3 is higher than the reference voltage, the comparator CP2 generates an L-output, and the electromagnet Mg2 is electrically energized to attract the member 121. When the object brightness is higher than a predetermined value, the resistance of the light-receiving element R1 becomes small. Accordingly, the voltage of the junction P1 becomes higher than the divided voltage by the resistors R3 and R4, the output of the comparator CP1 becomes H and the transistor Q1 is turned off. Thus, power is not supplied to the electromagnet Mg1 and pop-up of the flash unit does not occur. Subsequently, the shutter release lever 101 is depressed to the second stroke. At this time, the member 121 is attracted by the electromagnet Mg2 and therefore, the member 121 does not hinder the operation of the shutter release lever 101 and thus, shutter release is effected and the exposure control circuit A1 operates and the exposure is controlled.

When the object brightness is lower than the predetermined value, the output of the comparator CP1 becomes L and the transistor Q1 is turned on. On the other hand, the transistor Q2 remains conductive by the charging current to the capacitor C1 for a predetermined time $T_0$ after the switch SW1 has been closed. Accordingly, in the meantime, the transistor Q1 is turned on and at that moment, the electromagnet Mg1 is electrically energized to attract the restraining lever 103 and the ring 105 is rotated clockwisely and therefore, the flash unit 111 pops up. At this time, the flash circuit A2 starts its flashlight emission preparing operation and charges the main capacitor CM by the DC/DC converter. Even if the object brightness becomes low after the predetermined time $T_0$ has elapsed, the power supply to the electromagnet Mg1 does not occur and thus, the pop-up, namely, the flashlight emission preparing operation, does not occur. The time $T_0$ is set so as to be equal to or shorter than the time required for the exposure control circuit A1 or the automatic focusing device, not shown, to be operated by the shutter release lever being depressed to the second stroke after the switch SW1 has been closed by the depression of the shutter release lever to the first stroke. Assuming that the shortest time from the closing of the switch SW1 till the depression of the shutter release lever to the second stroke is $T_{min}$ and that the delay time from the depression of the shutter release lever to the second stroke until the exposure control circuit A1 or the automatic focusing device, not shown, operates is $T_{del}$, $T_0 \leq T_{min} + T_{del}$. Accordingly, the time $T_0$ has already elapsed before the exposure control circuit A1 or the automatic focusing device operates and therefore, even if the low brightness is then detected for the first time, the flashlight emission preparing operation does not occur. In this manner, the noise by the flashlight emission preparing operation after exposure control or focus control has been started is prevented from imparting a hindrance to the exposure control or the focus control.

If, here, the voltage of the power source EB is insufficient, the output of the comparator CP2 becomes high and the electromagnet Mg2 is not energized and does not hold the member 121. Accordingly, before the shutter release lever 101 is depressed to the second stroke, the member 121 comes into engagement with the locking groove 101a of the lever 101 to stop any further depression of the lever 101. Accordingly, shutter release is locked.

The above-described auto pop-up is usually effected during the framing for photography and therefore, unless the release lever is depressed very quickly, it can be confirmed after the auto pop-up whether the charging of the main capacitor has been completed and thus, the possibility of wrong flashlight photography can be reduced.

Figure 3:
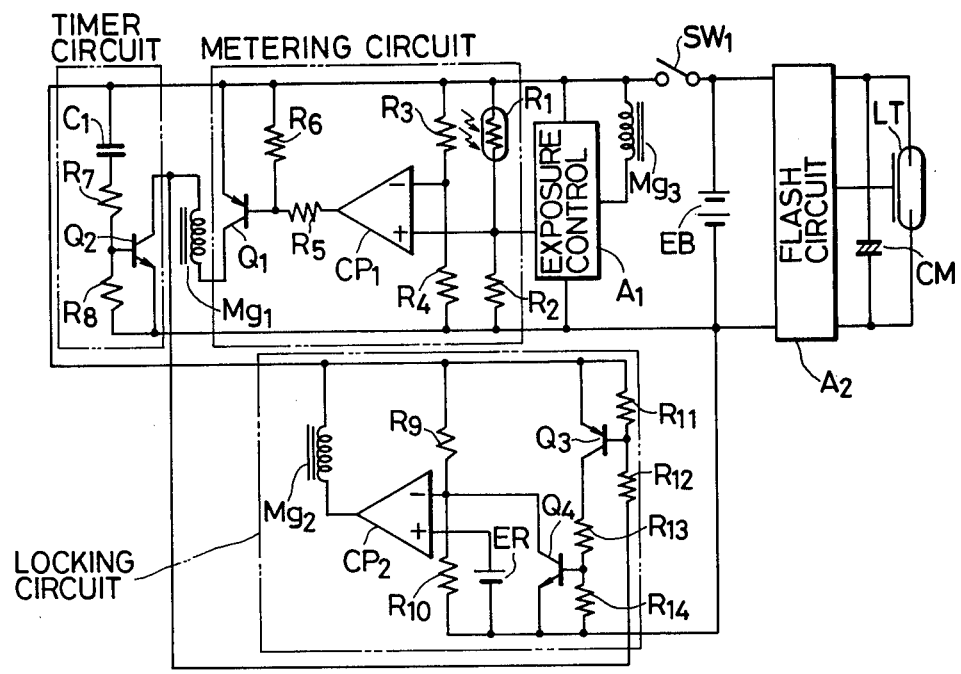
FIG. 3 diagramatically shows the circuit of a second embodiment of the present invention.

FIG. 3 shows a second embodiment of the present invention. In this embodiment, the locking circuit for shutter release locking is connected to a timer circuit and further includes resistors R11, R12, R13, R14 and transistors Q3, Q4. By this, shutter release is locked for the predetermined time $T_0$ during which the timer effects time count. The present embodiment is similar in the other points to the embodiment of FIG. 1. In FIG. 3, parts similar to those shown in FIG. 1 are given similar reference characters.

During the time that the switch SW1 is closed by depression of the shutter release lever to the first stroke and the transistor Q2 is turned on, the transistors Q3 and Q4 remain conductive and the output of the comparator CP2 is H. Therefore, the electromagnet Mg2 is not energized and does not attract the member 121. Accordingly, even if the shutter release lever 101 is depressed within the predetermined time $T_0$, it is stopped by the member 121 and shutter release is locked.

That is, even if the time $T_0$ set by the timer during which pop-up is possible is set to $T_0 > T_{min} + T_{del}$, shutter release is locked for the time $T_0$ and exposure control and focus control cannot be effected.

Figure 4:
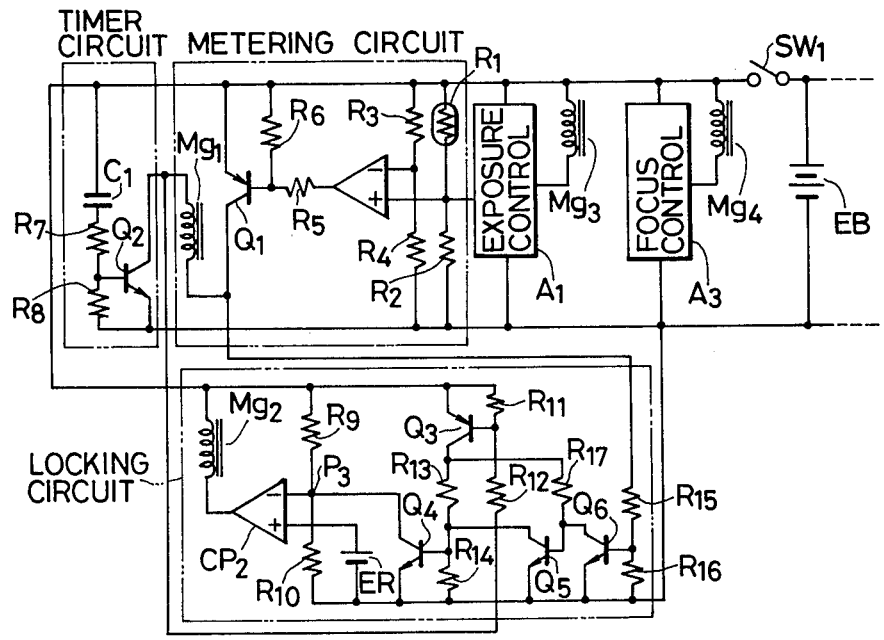
FIG. 4 diagramatically shows the circuit of a third embodiment of the present invention.

FIG. 4 shows a third embodiment of the present invention. This embodiment further includes a focus control device A3 and an electromagnet Mg4 for stopping the lens driving, and a shutter release locking circuit is connected to both of the timer circuit and the metering circuit and is further provided with resistors R15, R16, R17 and transistors Q5, Q6. In the other points, this embodiment is similar to that shown in FIG. 2. In the present embodiment, by the addition of the resistors R15–R17 and transistors Q5, Q6, shutter release is locked within the predetermined time $T_0$ and only in the case of low brightness.

As an automatic focusing device A3, use is made of the device disclosed, for example, in Japanese Laid-open patent application No. 43522/1978 (corresponding U.S. Pat. No. 4,059,756).

An electromagnet Mg4 stops a focusing lens moved to the in-focus position. In the present embodiment, the switch SW1 is closed by the first stroke of the shutter release lever and, when low brightness is detected, the flashlight emission preparing operation is effected. Subsequently, when the shutter release lever is further depressed to the second stroke, the automatic focusing device A3 is operated. When the shutter release lever is further depressed to the third stroke, exposure control is effected. Accordingly, if the release lever is maintained at a position between the second stroke and the third stroke, focus lock can be accomplished. That is, in this condition, the automatic focusing device A3 operates and focuses the lens to a predetermined distance and such condition is maintained and therefore, framing can be changed in that condition.

Operation will now be described.

The operation in response to the voltage of the power source EB is similar to that shown in FIG. 1 and therefore need not be described.

The switch SW1 is closed by the depression of the shutter release lever to the first stroke. For the predetermined time $T_0$ after this, the transistor Q2 remains conductive as in the embodiment of FIG. 1. When the object brightness is low, the transistor Q1 is turned on and the electromagnet Mg1 is electrically energized to effect pop-up. By the transistor Q1 being turned on, the transistor Q6 is turned on and the transistor Q5 is turned off and the transistor Q3 is turned on, so that the transistor Q4 is also turned on and the junction P3 assumes L-level and therefore, the output of the comparator CP2 becomes H and power is not supplied to the electromagnet Mg2 and thus, shutter release becomes locked. After the lapse of the predetermined time $T_0$, the transistor Q2 is turned off and the transistors Q3 and Q4 are turned off and, when the source voltage is above a predetermined value, the output of the comparator CP2 becomes L and the electromagnet Mg2 is electrically energized, so that the shutter release lock is released.

When the object brightness is above a predetermined value, the output of the comparator CP1 becomes H and the transistor Q1 is turned off. Therefore, power is not supplied to the electromagnet Mg1 and pop-up does not occur. On the other hand, for the predetermined time $T_0$ after the switch SW1 has been closed, the transistor Q2 remains conductive. Accordingly, the transistor Q3 is turned on. However, the transistor Q6 is in OFF state and therefore, the transistor Q5 is turned on. Accordingly, the transistor Q4 is rendered non-conductive and the output of the comparator CP2 becomes L and power is supplied to the electromagnet Mg2, so that shutter release is not locked. That is, in the case of high brightness, shutter release is not locked even during the predetermined time $T_0$. Originally, in such a case, the pop-up operation does not occur and therefore, the locking of shutter release is unnecessary, and the present embodiment is excellent in this respect.

We claim:

1. In a camera provided with a flash unit, a device for limiting the preparatory operation for flashlight emission of said flash unit, said device comprising:
   (a) metering means for detecting that the brightness of an object to be photographed is lower than predetermined brightness and producing a detection signal;
   (b) means operable to start photographing, said operable means having a first operation stage for producing a first signal and a second operation stage for producing a second signal subsequently to said first operation stage, the photographing being started in response to said second signal; and
   (c) means including timer means responsive to said first signal to count a predetermined time set shorter than the time required from after said first signal is produced until the photographing is started in response to said second signal, said means causing said flash unit to effect the preparatory operation for flashlight emission in response to the detection signal of said metering means produced while said timer means is effecting the time count.

2. The device according to claim 1, wherein said camera has exposure control means for controlling said camera to obtain a proper exposure, and said exposure control means is operated in response to said second signal, whereby said photographing is started.

3. The device according to claim 1, wherein said camera has a picture-taking lens and automatic focusing means for focusing said lens to the object to be photographed, and said automatic focusing means is operated in response to said second signal, whereby said photographing is started.

4. The device according to claim 1, wherein said predetermined time counted by said timer means is set shorter than the sum of the shortest time required for said operable means to shift from said first operation stage to said second operation stage and the time required from after said second signal is produced until said photographing is started.

5. The device according to claim 4, further comprising means responsive to said timer means to prevent said operable means from being operated to said second operation stage while said timer means is effecting the time count.

6. The device according to claim 5, further comprising means responsive to said metering means to disable said preventing means when said detection signal is absent.

* * * * *